United States Patent
Csurka

(10) Patent No.: US 8,009,921 B2
(45) Date of Patent: Aug. 30, 2011

(54) CONTEXT DEPENDENT INTELLIGENT THUMBNAIL IMAGES

(75) Inventor: Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 863 days.

(21) Appl. No.: 12/033,434

(22) Filed: Feb. 19, 2008

(65) Prior Publication Data

US 2009/0208118 A1    Aug. 20, 2009

(51) Int. Cl.
*G06K 9/62* (2006.01)
*G06K 9/36* (2006.01)
*G06K 9/46* (2006.01)

(52) U.S. Cl. ........................... 382/228; 382/277

(58) Field of Classification Search .......... 382/171–173, 382/224–225, 228, 270, 272, 276–277, 282–283, 382/291–292, 298, 309; 345/419, 421, 473, 345/619, 620; 358/538; 704/245
See application file for complete search history.

(56) References Cited

U.S. PATENT DOCUMENTS

| | | | |
|---|---|---|---|
| 5,978,519 A | 11/1999 | Bollman et al. | |
| 6,545,743 B1 | 4/2003 | Luo et al. | |
| 7,034,848 B2 | 4/2006 | Sobol | |
| 7,058,567 B2 | 6/2006 | Aït-Mokhtar et al. | |
| 7,126,606 B2 * | 10/2006 | Beda et al. | 345/473 |
| 7,167,583 B1 * | 1/2007 | Lipson et al. | 382/147 |
| 7,417,645 B2 * | 8/2008 | Beda et al. | 345/619 |
| 7,511,718 B2 * | 3/2009 | Subramanian et al. | 345/619 |
| 2006/0072847 A1 | 4/2006 | Chor et al. | |
| 2006/0109282 A1 | 5/2006 | Lin et al. | |
| 2006/0280364 A1 | 12/2006 | Ma et al. | |
| 2006/0285755 A1 * | 12/2006 | Hager et al. | 382/224 |
| 2007/0005356 A1 | 1/2007 | Perronnin | |
| 2007/0025643 A1 | 2/2007 | LeMeur et al. | |
| 2007/0258648 A1 | 11/2007 | Perronnin | |
| 2009/0208118 A1 * | 8/2009 | Csurka | 382/228 |
| 2010/0040285 A1 * | 2/2010 | Csurka et al. | 382/170 |

FOREIGN PATENT DOCUMENTS

| | | |
|---|---|---|
| EP | 1 748 385 | 1/2007 |
| EP | 1 764 736 | 3/2007 |

OTHER PUBLICATIONS

Ait-Mokhtar, et al., *Incremental Finite-State Parsing*, Proceedings of Applied Natural Language Processing, Washington, Apr. 1997.
Ait-Mokhtar, et al., *Subject and Object Dependency Extraction Using Finite-State Transducers*, Proceedings ACL'97 Workshop on Information Extraction and the Building of Lexical Semantic Resources for NLP Applications, Madrid, Jul. 1997.
Z.Q.Zhang, et al., Multi-View Face Detection With FloatBoost, *In Proc. of the 6th IEEE Workshop on Applications of Computer Vision*, pp. 184-188, 2002 (Abstract).

(Continued)

*Primary Examiner* — Amir Alavi
(74) *Attorney, Agent, or Firm* — Fay Sharpe LLP

(57) ABSTRACT

An apparatus and method are disclosed for context dependent cropping of a source image. The method includes identifying a context for the source image, identifying a visual class corresponding to the identified context from a set of visual classes, applying a class model to the source image to identify a candidate region of the image based on its relevance to the visual class, and identifying a subpart of the source image for cropping, based on the location of the candidate region.

26 Claims, 10 Drawing Sheets

OTHER PUBLICATIONS

V. Blanz, et al., Face Recognition Based on Fitting a 3D Morphable Model, *IEEE Transactions on Pattern Analysis and Machine Intelligence*, vol. 25, No. 9, pp. 1063-1074, Sep. 2003.

L.Q. Chen, et al., A Visual Attention Model for Adapting Images on Small Displays, *ACM Multimedia Systems Journal*, vol. 9, No. 4, 2003.

B. Erol, et al., Multimedia Thumbnails for Documents, *In Proc. ACM MM'06*, pp. 231-240, Santa Barbara, CA (2006).

S. Avidan, et al., Seam Carving for Content-Aware Image Resizing, *ACM Transactions on Graphics*, vol. 26, No. 3, SIGGRAPH (2007) http://www/seamcarving.com/.

U.S. Appl. No. 11/170,496, filed Jun. 30, 2005, Perronnin.

U.S. Appl. No. 11/418,949, filed May 5, 2006, Perronnin.

U.S. Appl. No. 11/524,100, filed Sep. 19, 2006, Perronnin.

G. Csurka, et al., Visual Categorization with Bags of Key-Points, *In ECCV Workshop on Statistical Learning for Computer Vision*, (2004).

F. Perronnin, et al., Fisher Kernels on Visual Vocabularies for Image Categorization, *CVPR*, 2007.

D. Comaniciu, et al., Mean Shift: A Robust Approach Toward Feature Space Analysis, *IEEE Transactions on Pattern Analysis and Machine Intelligence*, vol. 24, No. 5, May 2002.

J. Shi, et al., Normalized Cuts and Image Segmentation, *IEEE Transactions on Pattern Analysis and Machine Intelligence*, vol. 22, No. 8, Aug. 2000.

R. Datta, et al., Studying Aesthetics in Photographic Images Using a Computational Approach, *ECCV, Part III*, pp. 288-301, 2006.

D. Carboni, et al., GeoPix: Image Retrieval on the Geo Web, from Camera Click to Mouse Click, *In Proc. of the 8th Conference on Human-Computer Interaction with Mobile Devices and Services*, ACM International Conference Proc. Series, vol. 159, pp. 169-172, 2006.

S. Wang, et al., IGroup: Presenting Web Image Search Results in Semantic Clusters, *CHI Proceedings*, San Jose, CA, 2007.

F. Jing, et al. VirtualTour: An Online Travel Assistant Based on High Quality Images, *MM'06*, Santa Barbara, CA, Oct. 2006.

S.Z. Li., et al., FloatBoost Learning and Statistical Face Detection, *IEEE Transactions on Pattern Analysis and Machine Intelligence*, vol. 26, No. 9, Sep. 2004.

G. Ciocca, et al., Self-Adaptive Image Cropping for Small Displays, *Consumer Electronics, ICEE*, (2007).

V. Setlur, et al., Automatic Image Retargeting, *Northwestern University MUM*, 2005.

B. Suh, et al., Automatic Thumbnail Cropping and its Effectiveness, *UIST'03*, Vancouver, Canada, 2003.

Larlus, et al., Category Level Object Segmentation—Learning to Segment Objects With Latent Aspect Models, *International Conference on Computer Vision Theory and Applications*, Mar. 2007.

\* cited by examiner

CONTEXT DEPENDENT INTELLIGENT THUMBNAIL IMAGES

BACKGROUND

The exemplary embodiment relates to digital image processing. It finds particular application in connection with context dependent cropping of images for generation of thumbnail images.

Thumbnail images are widely used as means of conveying information, such as identifying a source image, a document containing the image, a set of images comprising the image, or the like. In the context of web browsing, for example, a user may review thumbnail images as a way to identify potentially relevant documents related to the subject matter shown in the thumbnail image. Thumbnails images are also incorporated into documents in place of an original image where space constraints do not permit an entire image to be included or where only a portion of the image is of interest.

A thumbnail image is derived from a source image by resizing and/or cropping the source image. Thumbnail images are typically about the same size as an individual's thumbnail, though the actual size of a thumbnail image can vary depending on the particular application for which it is being used. Automated techniques have been developed for identifying salient features of an image, such as faces. These features are then retained in the cropping and become the focus of the thumbnail image.

There are many instances, however, where the resulting thumbnail image may not provide useful information for the specific application in which it is being used. For example, a researcher who is web browsing to find photographs or other information about a famous building may be more interested in what is often in the background of a photograph. This region is likely to be excluded from the thumbnail in automated cropping techniques employing saliency maps or rendered indecipherable when the source image is resized by reducing its resolution.

INCORPORATION BY REFERENCE

The following references, the disclosures of which are incorporated herein in their entireties by reference, are mentioned:

U.S. Pat. No. 7,034,848, entitled SYSTEM AND METHOD FOR AUTOMATICALLY CROPPING GRAPHICAL IMAGES, by Sobol, discloses an image cropping system. A set of digital data that defines a graphical image is stored in memory. An object detector analyzes the set of digital data and automatically identifies a portion of the digital data that defines an image of a particular object. The image cropper then uses the identified portion to determine a position of the object image within the graphical image. Based on the position of the object image within the graphical image, the image cropper automatically crops the digital data. The position of the object image within the graphical image serves as a reference for determining which portions of the set of digital data should be cropped.

U.S. Pat. No. 5,978,519, entitled AUTOMATIC IMAGE CROPPING, by Bollman, et al., discloses a method for automatic cropping of images containing regions where intensity levels are uniform and other regions where intensity levels vary considerably. An image to be automatically cropped is scaled down to a grid and divided into non-overlapping blocks. The mean and variance of intensity levels are calculated for each block. Based on the distribution of variances in the blocks, a threshold is selected for the variance. All blocks with a variance higher than this threshold variance are selected as regions of interest. The regions of interest are then cropped to a bounding rectangle.

U.S. Pub. No. 20060109282, entitled NON-RECTANGULAR IMAGE CROPPING METHODS AND SYSTEMS, by Lin, et al., discloses techniques for automatically cropping an image to a desired size and non-rectangular crop shape. A non-rectangular crop shape can, for example, be input to an image processing system. The non-rectangular crop shape is then used to process the original image to generate the desired crop.

U.S. Pat. No. 6,545,743, entitled PRODUCING AN IMAGE OF A PORTION OF A PHOTOGRAPHIC IMAGE ONTO A RECEIVER USING A DIGITAL IMAGE OF THE PHOTOGRAPHIC IMAGE, by Luo, et al., discloses the use of saliency maps in image cropping.

U.S. Pub. No. 20060280364 entitled AUTOMATIC IMAGE CROPPING SYSTEM AND METHOD FOR USE WITH PORTABLE DEVICES EQUIPPED WITH DIGITAL CAMERAS, by Ma, et al., discloses an automatic image cropping system for use with a portable device having an image capture mechanism and a limited resource for storing or transmitting captured information. The system includes a region of interest suggestion engine which selects an image region candidate determined as likely to be of most interest to the user.

U.S. Pub. No. 20060072847, entitled SYSTEM FOR AUTOMATIC IMAGE CROPPING BASED ON IMAGE SALIENCY, by Chor, et al., discloses a computer-implemented method of automatically suggesting a cropped area of a digital image. An area of interest in an original image is determined. A design rule is applied to the area of interest to determine a suggested crop area of the original image. The suggested cropped area of the original image is presented to a user such that the suggested crop area may be resized, relocated, or accepted by the user. The design rule may be the Rule of Thirds or another, more sophisticated rule.

U.S. Pub. No. 20070005356, entitled GENERIC VISUAL CATEGORIZATION METHOD AND SYSTEM by Florent Perronnin, discloses generic visual categorization methods which complement a general vocabulary with adapted vocabularies that are class specific. Images to be categorized are characterized within different categories through a histogram indicating whether the image is better described by the general vocabulary or the class-specific adapted vocabulary.

U.S. Pub. No. 20070258648, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. Each generative model embodies a merger of a general visual vocabulary and an image class-specific visual vocabulary. A gradient-based class similarity modeler includes a model fitting data extractor that generates model fitting data of an image respective to each generative model and a dimensionality enhancer that computes a gradient-based vector representation of the model fitting data with respect to each generative model in a vector space defined by the generative model. An image classifier classifies the image respective to the plurality of image classes based on the gradient-based vector representations of class similarity.

U.S. Pub. No. 20070025643, entitled METHOD AND DEVICE FOR GENERATING A SEQUENCE OF IMAGES OF REDUCED SIZE, by Olivier Le Meur, et al., and related EP1748385 and EP1764736, disclose a method for generating a reduced image having a size smaller or equal to that of a source image. The at least one reduced image is generated by extracting an image part from the source image whose size and position depend on the perceptual interest of the pixels in the image part.

BRIEF DESCRIPTION

In accordance with one aspect of the exemplary embodiment, a method for cropping a source image includes identifying a context for the source image and identifying a visual class corresponding to the identified context from a set of visual classes. A class model is applied to the source image to identify a candidate region of the source image based on the candidate region's relevance to the visual class. A subpart of the source image is identified for cropping, based on the candidate region.

In accordance with one aspect of the exemplary embodiment, an apparatus for cropping a source image includes a context finder which automatically identifies a context for the source image. A visual categorizer automatically identifies a visual class corresponding to the identified context from a set of visual classes and applies a class model to the source image to identify a candidate region of the image based on its relevance to the visual class. An image cropper crops a subpart of the source image based on the candidate region. A memory stores the source image to be cropped.

In accordance with another aspect, a computer implemented method of variable printing includes identifying a context for a document to receive a cropped image, identifying a visual class corresponding to the identified context from a set of visual classes, applying a class model to a source image to identify a candidate region of the image based on its relevance to the visual class, cropping a subpart of the source image based on the candidate region, and incorporating the cropped subpart into the document.

In accordance with another aspect, a method for assisting a user in assessing the relevance of documents responsive to a query includes receiving a user query, retrieving a document responsive to the query, identifying a context based on at least one of the user query and the retrieved document, identifying a visual class corresponding to the identified context from a set of visual classes, applying a class model to a source image in the retrieved document to identify a candidate region of the source image based on its relevance to the visual class, identifying a subpart of the source image for cropping based on the candidate region; and displaying a context-dependent thumbnail derived from the identified subpart to assist a user in assessing the relevance of the document.

DETAILED DESCRIPTION

Figure 1:
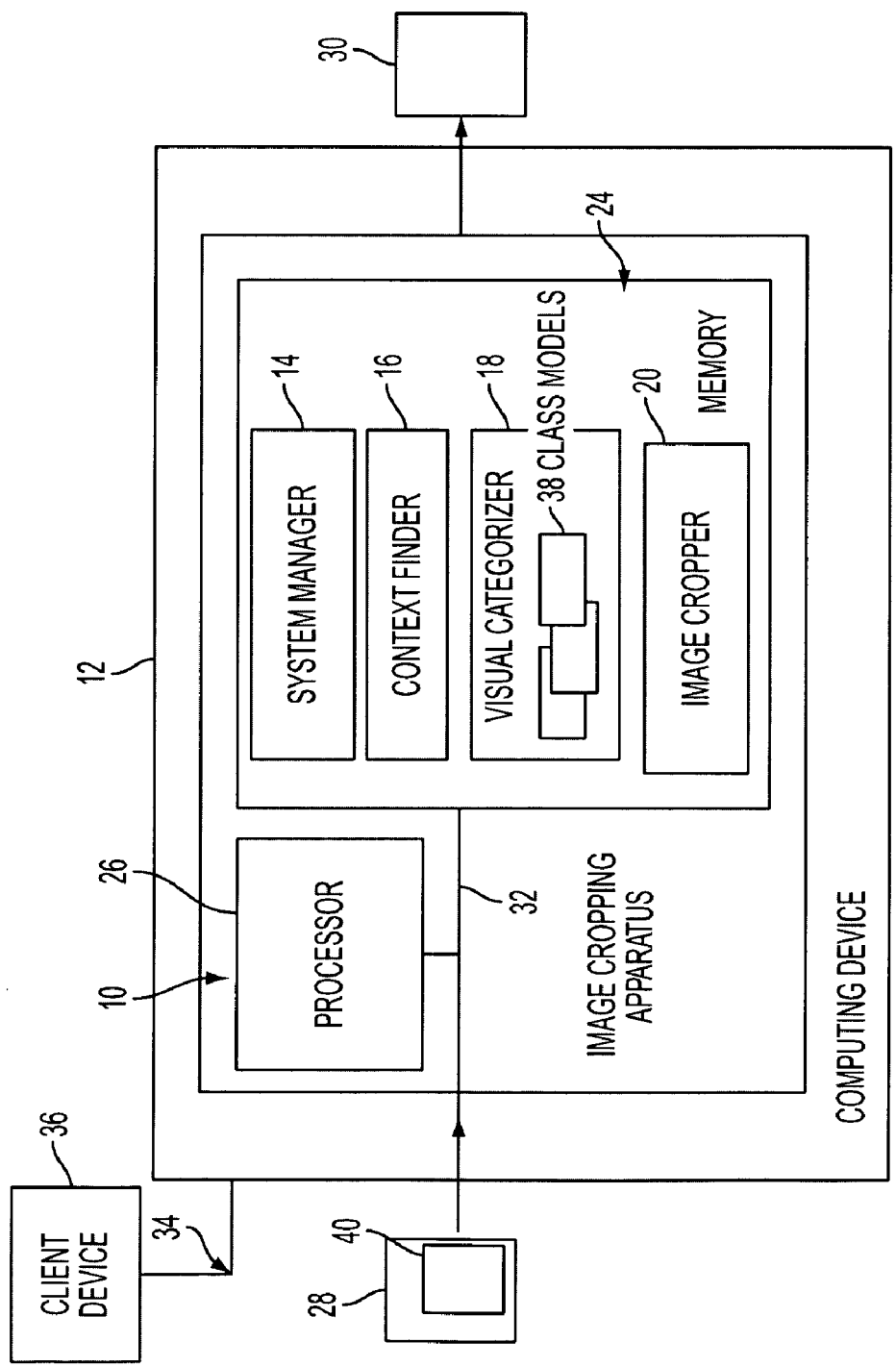
FIG. 1 is a functional block diagram of an apparatus for generating context dependent thumbnail images in accordance with one aspect of the exemplary embodiment.

Aspects of the exemplary embodiment relate to an apparatus and method for automated context dependent cropping of source images for generating context dependent thumbnail images ("intelligent thumbnails"). The method includes cropping image subparts based on contextual information. Given a source image and a visual class derived from the contextual information, a subpart of the image is automatically selected for cropping, based on its relevance to the visual class. In particular, one or more probability maps are generated in which pixels of the source image are assigned a probability of being associated with one of a set of visual classes. Based on the probability map, one or more regions of the image are identified as candidates for cropping. A thumbnail image is generated by cropping a generally rectangular subpart of the image which incorporates at least a part of at least one of the identified candidate regions. The thumbnail/image-crop is thus deduced from the relevant class probability map which is built directly from the source image, using previously trained class models. The intelligent thumbnail/image-crop is thus based on understanding the most relevant or most interesting image region according to the context in which the thumbnail is being used.

Although specific reference is made herein to the source images as being photographs, the source image may comprise other types of digital image, such as graphics, images with associated text, tables, graphs, medical images, maps, composite images, sets of images, video images, combinations thereof, and the like. A digital image includes image data for each pixel of a generally two-dimensional array of pixels. The image data may be in the form of gray scale values, where gray can refer to any color separation, or any other graduated intensity scale.

The source image may form a part of a document which also comprises information in the form of one or more of text, tags, metadata, or audio information (e.g., in the case of a video), from which a text transcript can be derived.

The exemplary context dependent thumbnail is generally of smaller size than the source image, although in some embodiments, may be the same size or larger than the source image. It can comprise an optionally reduced resolution, cropped subpart of the source image, i.e., in general, the thumbnail is derived from only a portion of the image data in the original image.

The exemplary embodiment finds use in a variety of applications including image asset management, web browsing, visualization, displaying images on the small displays of mobile devices, presenting video summaries, variable printing, and the like. In variable printing, two or more different versions of a document can be created, e.g., by inserting different images in a placeholder. Unlike a classical thumbnail (where the image is simply resized to a target size), the creation of the intelligent thumbnail include a cropping stage to resize the image in order to show only an interesting part of the image. Advantages of this type of thumbnail include better quality and therefore visibility, faster browsing and search, relevant part emphasis, and the like. For example, the intelligent thumbnail can be choosen to show a person's face to make the person recognizable.

Unlike existing saliency-based approaches, where the thumbnail depends only on the image content itself and generally gives a unique solution (thumbnail) for a given source image and target size, which is independent of the context, the present method allows different context dependent thumbnails to be created automatically from the same source image, depending on the context in which the thumbnail and/or its source image is being used. In the exemplary method, a context is input and the output thumbnail can vary accordingly. By "automatic," it is meant that different thumbnails can be generated without the need for human input, e.g., with a computer system utilizing appropriate software.

The exemplary method takes advantage of the fact that a source image may contain several different objects, such that each of them can be relevant in different situations. Each object can be considered to comprise a region of contiguous pixels with at least a threshold probability of being associated with a visual class. The exemplary method is generic in that it can deal with a variety of different objects to be cropped.

With reference to FIG. 1, an apparatus 10 for generating a context dependent thumbnail is shown. The exemplary apparatus 10 may be hosted by a computing device 12. The exemplary apparatus 10 includes a system manager 14, a context finder 16, a visual categorizer 18 and an image cropper 20. The system manager 14, context finder 16, visual categorizer 18, and image cropper 20 can be implemented in software, hardware, or a combination thereof. In the embodiment illustrated in FIG. 1, these processing components 14, 16, 18, and 20 are implemented in software instructions stored in memory 24 and are executed by an associated processor 26 of the apparatus 10. The processor 26 executes the instructions for performing the method outlined in any one or more of FIGS. 2, 4, and 5 and may also control the overall operation of the computing device 12. In particular, the apparatus 10 receives as input a source image 28 and generates therefrom a context dependent thumbnail image 30. The various components of the apparatus 10 may be all connected by a bus 32.

The computing device 12 may be a general purpose computer or a dedicated computing device, such as a PC, e.g., a desktop, laptop, or palmtop computer, a portable digital assistant (PDA), a digital camera, mobile phone with a display, pager, or the like. In one exemplary embodiment, the computing device is connected via a network 34 to a client computing device 36 with a web browser. The network 34 can be a local area network (LAN), a wide area network (WAN), or the Internet and can include wired and/or wireless links.

The memory 24 may represent any type of computer readable medium such as random access memory (RAM), read only memory (ROM), magnetic disk or tape, optical disk, flash memory, or holographic memory. In one embodiment, the memory 24 comprises a combination of random access memory and read only memory.

The processor 26 may be a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In some embodiments, the processor 26 and memory 24 may be combined in a single chip.

The operation of the processing components 14, 16, 18, and 20 will be best understood with reference to the method described in greater detail below. Briefly, the system manager 14 controls the overall operations of the other components 16, 18, 20. The context finder 16 identifies a context in which the thumbnail or original image is to be used. The visual categorizer 18 generates one or more probability maps for categories (visual classes) associated with the identified context and from these, identifies at least one candidate region of the source image for cropping. In the exemplary embodiment, the visual categorizer 18 includes or accesses a set 38 of class models $c_m$ (classifiers), each associated with a respective visual class c. Each of the classifiers $c_m$ has been trained on a set of training images which have been manually classified, based on image content, into that class. Based on the probability maps, the categorizer 18 identifies a candidate region or region of interest (ROI) and, using this region as a reference, automatically selects a subpart 40 of the image for cropping. The subpart may be selected based on predetermined selection criteria, such as the size of the ROIs, their proximity, the desired resolution of the thumbnail image, and so forth.

The image cropper 20 crops the source image 28 to generate the context dependent thumbnail image. During processing, image data and processed image data, such as probability maps, may be stored in memory, such as memory 24 or a separate memory.

Figure 2:
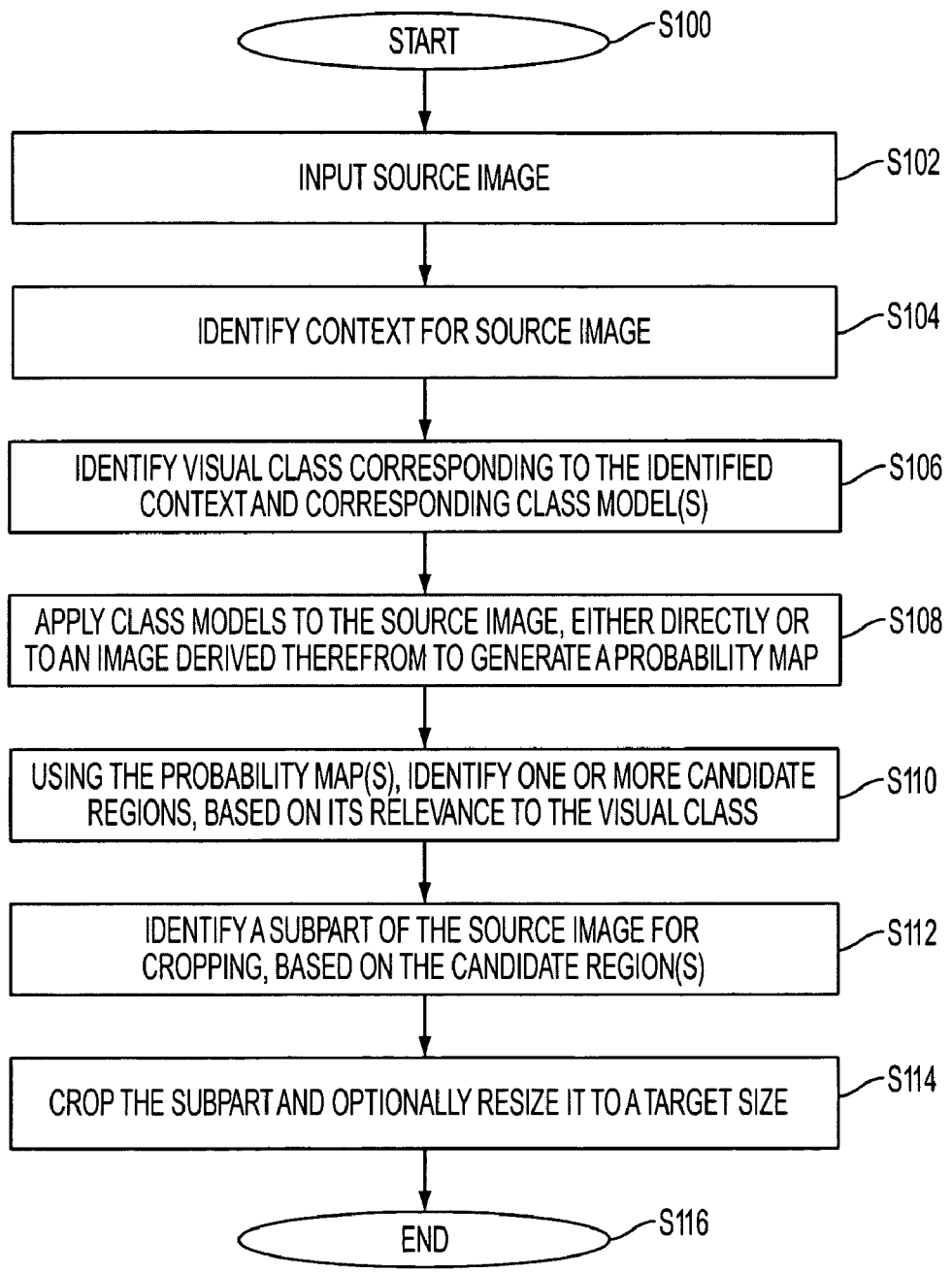
FIG. 2 illustrates a method for generating context dependent thumbnail images in accordance with another aspect of the exemplary embodiment.
Figure 3A:
FIG. 3 graphically illustrates the generation of probability maps for a source image.
Figure 3A:
Figure 3A:
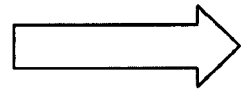
Figure 3B:
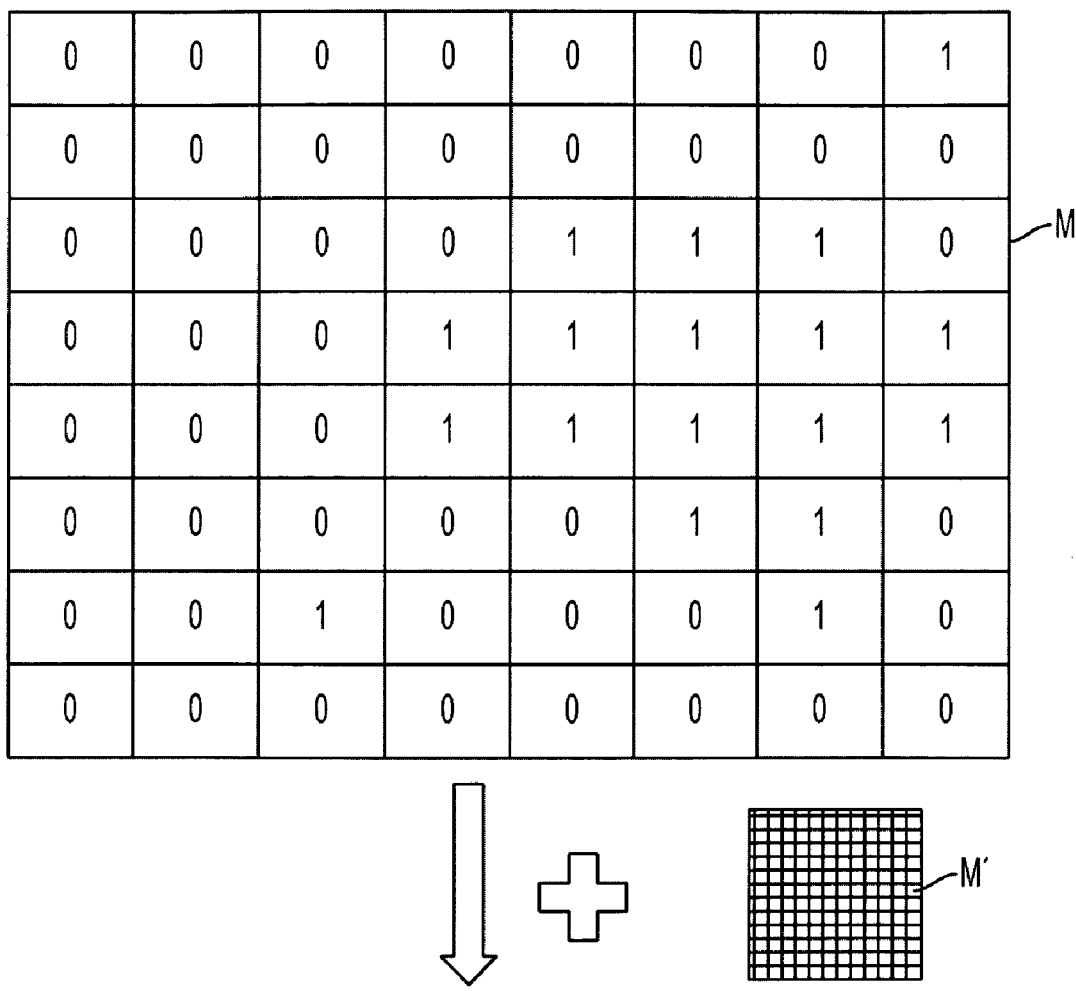
Figure 3C:
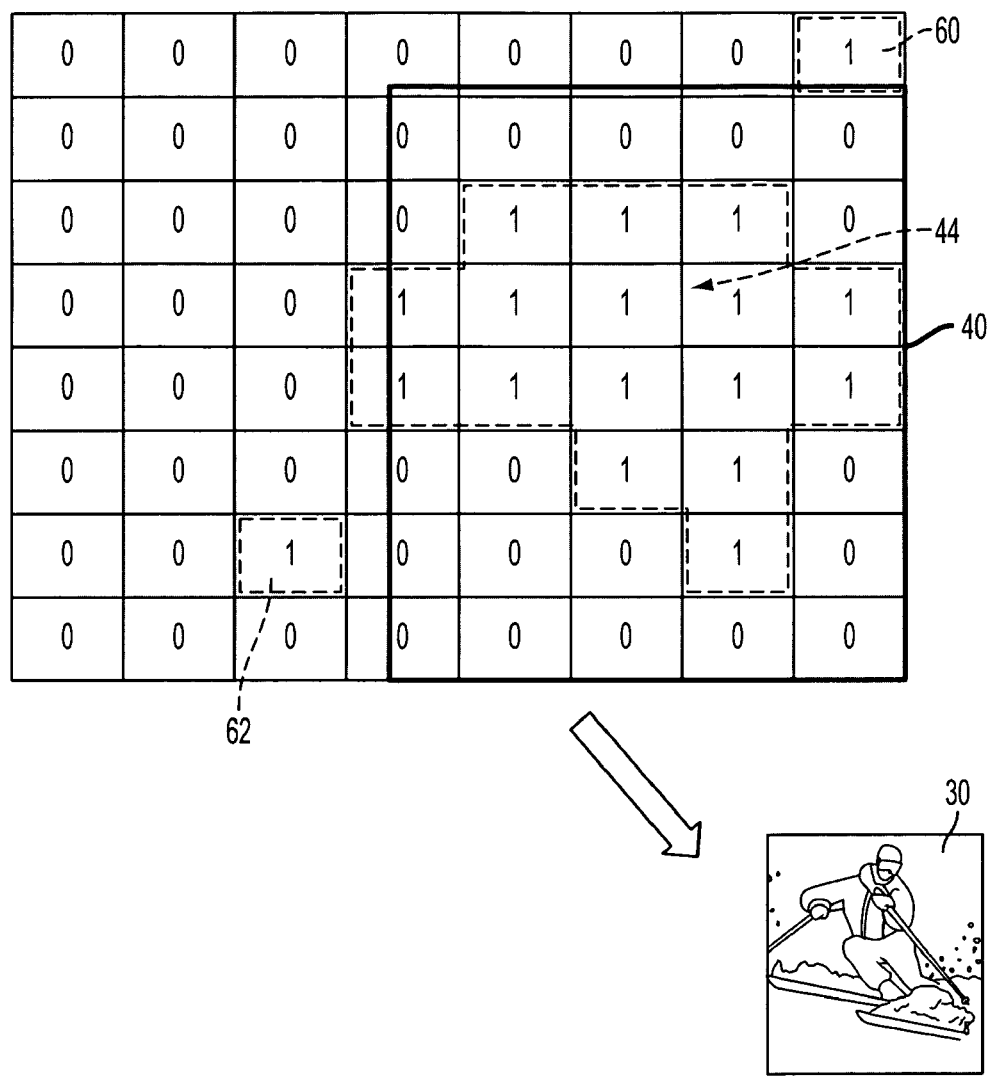

FIG. 2 illustrates an exemplary method for generating a context dependent thumbnail image 30. FIG. 3 schematically illustrates some of these steps for an exemplary source image 28 in the form of a photograph. The method may include fewer, more or different steps from those illustrated and the steps need not all proceed in the order illustrated. The method presumes that the visual categorizer 18 (specifically, class models $c_m$) has been trained, for example, on a set of categorized training images, as will be described in greater detail below. The method begins at S100.

At step S102, a source image 28 is input to the apparatus 10 and may be stored in memory 24. At step S104, a key context $c_k$ (or several contexts) is identified for the source image 28. The key context $c_k$ can be a source related context, e.g., identified from a context in which the source image 28 is being used, or a target related context, e.g., identified from the context in which the thumbnail 30 to be generated is to be used. At S106, a visual class c corresponding to the key concept is identified from a set of visual classes. The associated class model(s) $c_m$ for class c are retrieved. At S108, using the selected class model(s), one or more class probability maps P (FIG. 3) are generated. The probability map(s) expresses, for each pixel in the source image 28 (or a reduced resolution version thereof) a probability p that the pixel (or an object of which it forms a part) is in that class c. In general, the probability is related to a determined probability that the pixel is part of an associated group of pixels (referred to herein as a blob) which is classified in that class.

At S110, candidate regions 42 are identified, based on the class probability map(s) P. At S112, a subpart 40 (FIG. 3) of the image 28 is identified for cropping, based on the candidate regions 42. If there are several key concepts selected, individual image-crops or combined image-crops can be considered using the set of class probability maps P. Similarly, if multiple instances of the same concept are present in disconnected regions (e.g., cars in a car race) either one of these regions 42 is selected or they can be combined as discussed in further detail below. At S114, the subpart 40 of source image 28 is cropped and may undergo further processing, such as reducing resolution, resizing, and the like. The method ends at S116.

The method illustrated in FIG. 2 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for generating a context dependent thumbnail image. Further details on the apparatus and the steps of the exemplary method now follow.

Image Input (S102)

The image 28 to be processed may be input in any suitable format, such as PDF, TIFF, etc. The image may be input from any suitable image storage medium, such as a disk, memory stick, hard drive, the like or transferred via a network, wireless link, etc. In some embodiments, the image may be converted to a form in which it can be processed more easily and may optionally be converted to a lower resolution to reduce computation time.

Context Identification (S104)

The purpose of this step is to analyze the context $c_k$ in order to identify a visual class c or classes for the source image 28. The context can be any information from which the system deduces the most relevant part of the source image. The context $c_k$ may be identified in different ways, depending on how the thumbnail 30 is to be used. In one embodiment, the context may be derived from information associated with the source image 28 or target image 30, for example, from surrounding text or meta data (location, time, caption, tags).

Figure 4:
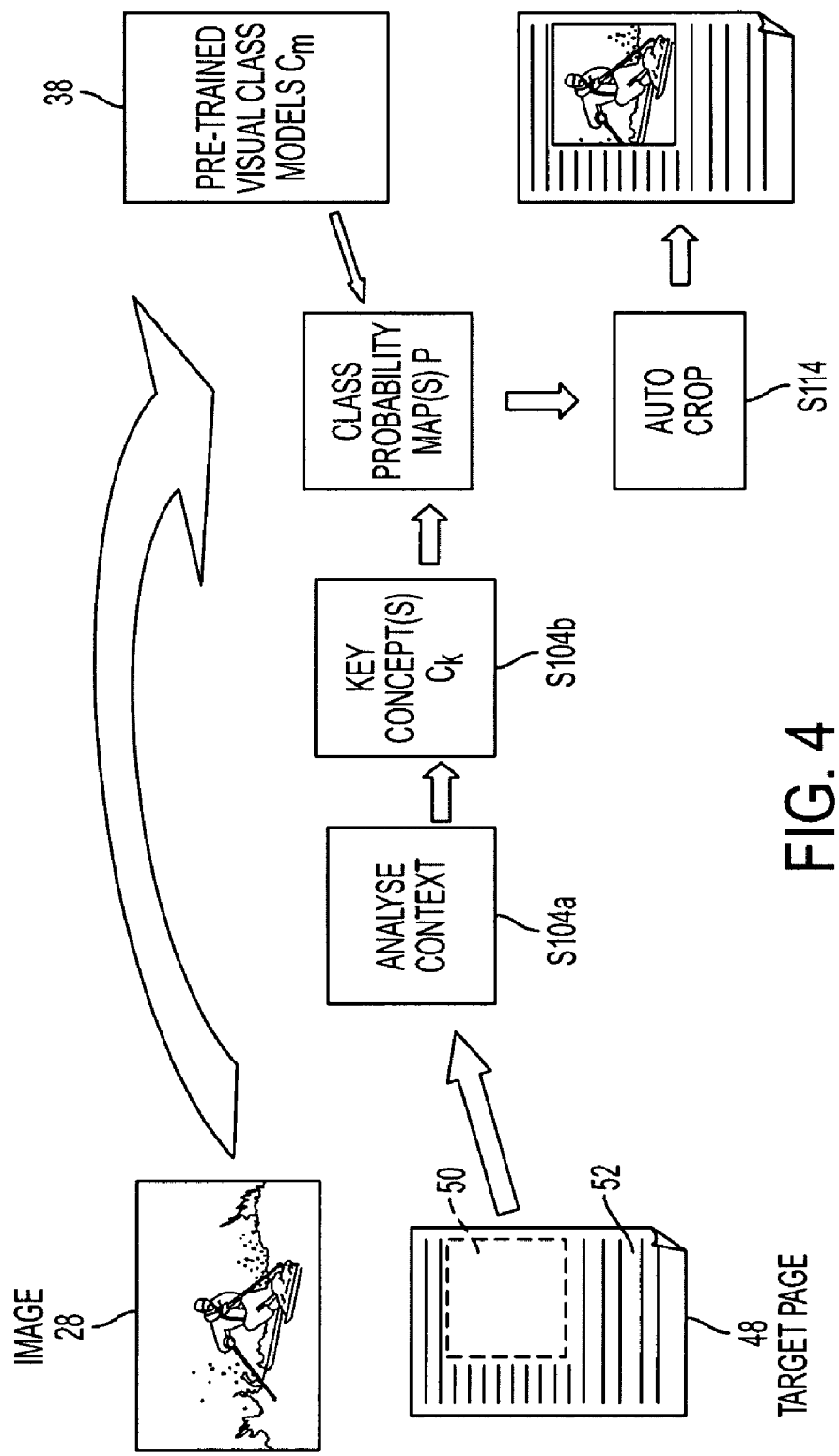
FIG. 4 graphically illustrates an application of the exemplary embodiment in which context dependent thumbnail images are generated for incorporation into a document suitable for variable printing.

FIG. 4 illustrates an example of the case where the context $c_k$ is derived from the target context, i.e., the context in which the thumbnail image 30 is to be used. Such is the case in variable printing of a target page 48, where an image placeholder 50 is to be filled with a context dependent thumbnail 30, the context $c_k$ may be determined from the text 52 surrounding the placeholder, and/or from personalized information associated with the document comprising the target page. For example, the text 52 may be searched for keywords which are indexed in a database according to a respective context.

Figure 5:
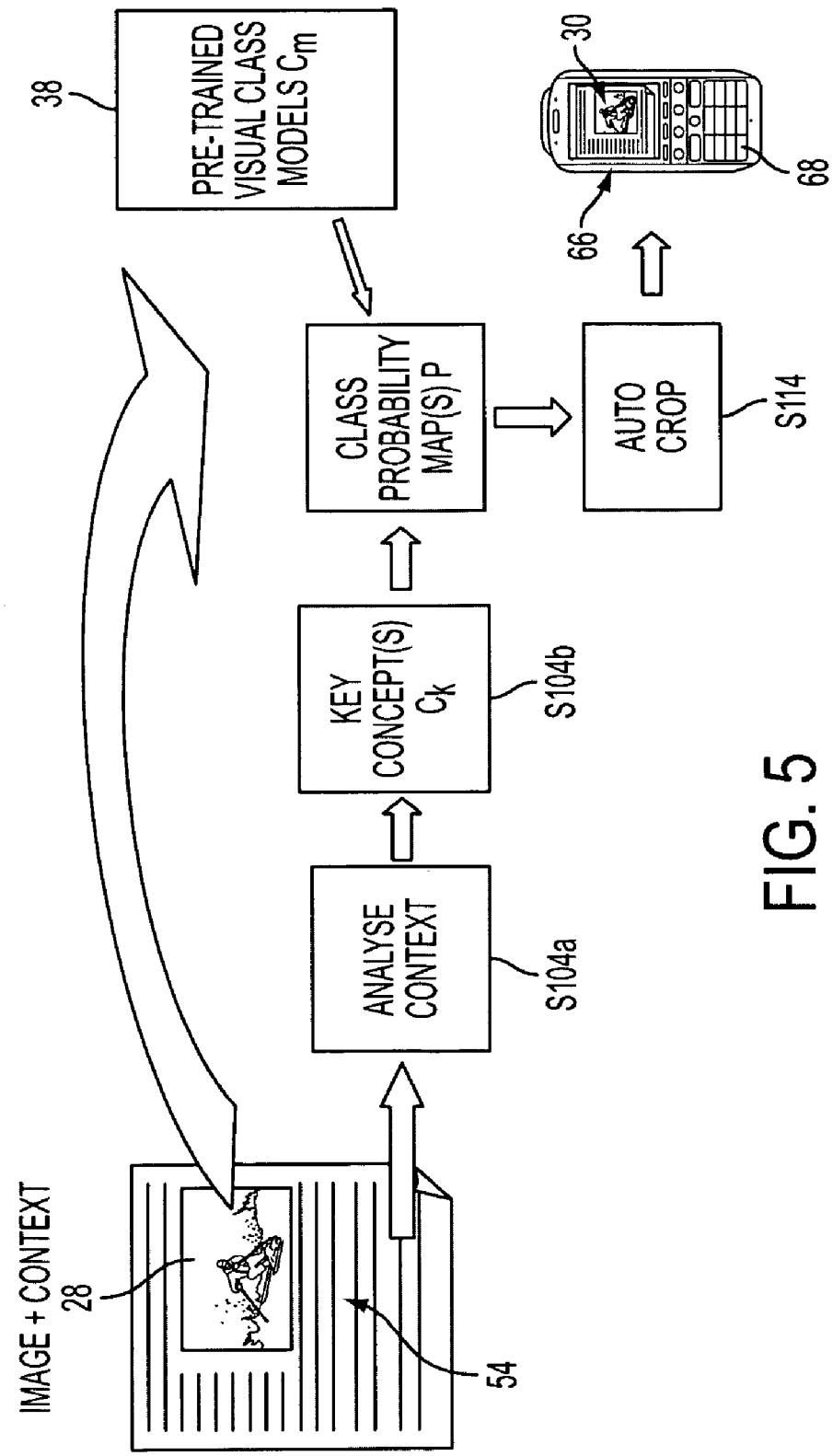
FIG. 5 a graphically illustrates one application of the exemplary embodiment in which context dependent thumbnail images are generated for document searching.

In another embodiment, the concept $c_k$ is derived from text 52 surrounding a source image 28 in a source document 54, as illustrated in FIG. 5. In the case of a thumbnail to be presented to a searcher to assist in retrieving documents responsive to a keyword-type search query, the context may be derived from the keywords used in the search query.

If the context $c_k$ is the query words or image tags the identification of the context is straightforward. For example, if the user inputs the search query "car" to a search engine, the identified context may be "cars", or expanded to a more general context, such as "motor vehicles."

If the context $c_k$ is derived from related text information (e.g., surrounding text) more advanced text analysis may be applied. Various methods may be employed for this. In one embodiment, text categorization is used, for example, using CategoriX, available from Xerox Corporation. Such a system includes a training tool, which learns probabilistic models from a collection of already categorized documents and a categorization tool, which compares each new document with the models to infer the probable context to which it should be assigned. In another embodiment natural language processing (NLP), text parsing, semantic analysis, name entity extraction, and so forth, may be performed. Such processing may be performed using the Xerox Incremental Parser (XIP), as described, for example, in U.S. Pat. No. 7,058,567; Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997, the disclosures of which are incorporated herein in their entireties, by reference. Based on these techniques, an overall key concept $c_k$, or a limited number of key concepts, can be identified. The key concept $c_k$ can be for example:

1. A subject: This can be one or more persons or named persons (e.g., a member of the family or a known personality). In this embodiment, a face detection tool may be applied, as described, for example, in Z. Zhang, et al. *Multi-View Face Detection With FloatBoost*, in Proc. 6th IEEE Workshop on Applications of Computer Vision, pp. 184-188 (2002). This can further be combined with a face recognition system, as described, for example, in V. Blanz, et al., *Face Recognition Based on Fitting a 3D Morphable Model*, IEEE Trans. Pattern Anal. Mach. Intell. 25(9): pp. 1063-1074 (2003). A subject may also be a named object, such as a landmark of a city, such as "Eiffel Tower" or "Golden Gate Bridge," and the like. In these cases a specific pre-trained object detection/recognition is applied to detect that specific subject in S104.

2. A visual object: Visual objects correspond to visually similar class c of objects such as people, cars, buildings, other inanimate objects, etc. The set of possible classes is very wide and therefore it is assumed that a set of visual classes is predefined for a given application and class models pre-trained for them for the visual categorization step.

3. Other: If the relevant concept $c_k$ does not correspond to any pre-trained object class c or is a more abstract concept covering multiple object classes, then in one embodiment, the thumbnail generated is not context dependent. In this embodiment, the thumbnail may be generated using conventional approaches, such as by using the classical visual attention/saliency map based approach as described, for example, in L.-Q. Chen, et al., *A visual attention model for adapting images on small displays*, ACM Multimedia Systems Journal, Springer-Verlag, Vol. 9, No. 4 (2003) and B. Erol, et al. *Multimedia Thumbnails for Documents*, Proc. ACM MM'06, pp. 231-240, Santa Barbara, Calif. (2006). In another approach, a simple rescaling/retargeting of the image may be employed for the "other" class of concepts, as described, for example, in S. Avidan, et al., *Seam Carving for Content-Aware Image Resizing*, ACM Transactions on Graphics, Vol. 26, No. 3, SIGGRAPH 2007.

As will be appreciated, the exemplary system and method may incorporate fewer than all of these types of concept. Particular focus is made herein to the second case ("objects").

Identifying Visual Classes (S106)

For concepts that are in case 2 (visual objects), it is assumed that the relevant key concept $c_k$ corresponds to a visual class c which, in turn, corresponds to a pre-trained visual object class model $c_m$ selected from the set of models 38.

Depending on the identified context $c_k$ of the image or the thumbnail, one or several visual classes (each corresponding to an object class model) are identified and linked to the image. This step assumes that pre-trained object class models are available for the identified concepts. In one embodiment, there may be a 1-1 correspondence between the concepts and the visual class models. In other embodiments, two or more concepts may be linked to a given visual class/class model. For example, car and truck concepts may be linked to a visual class "motor vehicles." In some embodiments, a concept may be linked to a plurality of visual class models. For example, cars may be linked to a visual classes "motor cars" corresponding to visual class models for "wheels," "radiator grill," "headlights," and the like.

A data structure, such as a lookup table or algorithm, may be used to identify a visual class for one or more identified concepts for which the appropriate class model(s) can be retrieved.

Class Probability Maps (S108)

Class probability maps P are computed for the image 28. In one embodiment, the visual categorizer 18 comprises a generic type of visual classifier $c_m$, such as the Xerox Generic Visual Classifier (GVC). Such a classifier generally labels patches (small regions) of an image based on semantic content, for example, by generating low level features, such as a features vector, one for each patch. Patches may be selected by subdividing the image in a regular grid pattern or by other methods. Further details of such a classifier $c_m$ are to be found, for example, in U.S. application Ser. No. 11/524,100, filed Sep. 19, 2006, entitled BAGS OF VISUAL CONTEXT-DEPENDENT WORDS FOR GENERIC VISUAL CATEGORIZATION, by Florent Perronnin; U.S. application Ser. No. 11/418,949, filed May 5, 2006, entitled GENERIC VISUAL CLASSIFICATION WITH GRADIENT COMPONENTS-BASED DIMENSIONALITY ENHANCEMENT, by Florent Perronnin; U.S. Pub. Nos. 20070005356 and 20070258648 by Florent Perronnin, the disclosures of all of which are incorporated herein in their entireties by reference, and in Csurka, G., Dance, C., Fan, L., Willamowski, J., and Bray, C., *Visual Categorization with Bags of Key-points*, in ECCV Workshop on Statistical Learning for Computer Vision (2004); F Perronnin and C. Dance, *Fisher Kernels on Visual Vocabularies for Image Categorization*, CVPR 2007.

In the exemplary embodiment, a class probability map P (FIG. 3) is generated for the source image 28, in which each pixel of the map contains the probability that an image pixel $x_n$ belongs to an object class c (that can be, for example, one of car, sky, person, etc). For multiple object classes, each class can be considered independently and the probability thus represents a binary decision, i.e., class versus non-class. For each class c, one or more class probability maps P can be generated, depending on the features of the image on which the probability is based, and subsequently combined into an overall probability map $P_o$.

The probability map P can be generated for the entire image, i.e., for every pixel in the image, or for a subset of the pixels distributed throughout the image, such as every $4^{th}$ pixel. In yet another embodiment, the map P is generated for a reduced resolution version of the image, e.g., after reducing the resolution by a factor or 2, 4, 16, 64, or the like. For ease of combination, the probability map(s) P can be binarized by thresholding the probabilities to generate a binary probability map M (FIG. 3). The features used in generating the probability map P can be for example, one or more of local color features and local gradient orientation features. For example, two (or more) probability maps M, M' can be generated, one for each of the features (FIG. 3). The two probability maps can then be combined into a single probability map P. In general, the exemplary method can employ any low level features that can be extracted on blobs (patches).

By way of example, one method of generating a probability map P will now be described. It is to be appreciated, however, that there are other ways of generating a probability map for identifying a region or regions of the image which has a higher probability of being associated with a visual class than other regions of the image. In this embodiment, to define the class-probability map P, a Fisher Kernel framework may be employed. Such an approach is described in F. Perronnin and C. Dance, *Fisher Kernels on Visual Vocabularies for Image Categorization*, CVPR 2007, and in above-mentioned U.S. application Ser. No. 11/418,949 by Perronnin, incorporated by reference in its entirety.

As applied herein, for training each of the classifiers $c_m$, a set of blobs (patches) is extracted from each of the images in a training set of images, and for each blob $B_i$, a low-level features vector $z_i$ is computed. The patches for the training images (and subsequent source images) may be of uniform size and uniformly distributed over the image. Using all the blobs from all training images, a universal visual vocabulary is built through the clustering of low-level feature vectors $z_i$ using Gaussian Mixture Models (GMM). The parameter set (weights, means, and covariance matrix) of the mixture model is denoted by $\theta=\{w_k, \mu_k, \Sigma_k k=1\ldots N\}$. The parameters are estimated using maximum likelihood on the data. Based on this generative model, the following gradient vector is computed:

$$\nabla_\theta \log p(z_i|\theta)$$

where p represents the likelihood that observation $z_i$ was generated by the GMM. This vector is normalized by the Fisher information matrix:

$$F_\theta = E[\nabla_\theta \log p(z_i|\theta) \cdot (\nabla_\theta \log p(z_i|\theta))^T]$$

where E represents the expectation and T represents matrix transposition, to obtain a so-called Fisher vector for each blob $B_i$ as follows:

$$f_i = F_\theta^{-1/2} \nabla_\theta \log p(z_i|\theta)$$

In this way, a new feature vector $f_i$ representing each blob $B_i$, is generated. This vector depends on the universal vocabulary $\theta$ but it does not depend on the object class. To generate a class dependent representation, a classifier $c_m$ is trained on these Fisher vectors. If a weakly labeled data set is employed (in which only if the class object is present or not in the image is known), the Fisher vectors $f_i$ can be cumulated to obtain a single vector F per image. A Sparse Logistic Regression (SLR) model can then be trained, as described in application Ser. No. 11/418,949 by Perronnin. If the data is strongly labeled, meaning that for each image, it is known which blobs belong to the class object and which blobs belong to other objects or to the background, the SLR can be trained on the labeled Fisher vectors corresponding to the blobs for the class object.

Let $A=\{a_1, a_2, \ldots a_D\}$ and let b denote the $D+1^{th}$ parameter of the trained linear classifier, where D is the dimension of the Fisher vectors. Then, the probability of a blob $B_i$ belonging to the class c is given by:

$$P(\gamma_i = c|z_i, \theta, A, b) = (1+\exp(-(f_i A + b)))^{-1} \quad (1)$$

where $\gamma_i$ is the hidden class variable associated with the feature vector $z_i$ (and therefore respectively with the blob $B_i$) which takes values from $\{c, \bar{c}\}$.

Note that in the case of weakly labeled data, a classifier trained on whole images can be used to classify individual blobs. However this is not a problem as the Fisher vector of a blob is considered as the cumulative Fisher vector of an image containing that single blob.

Equation (1) gives the class probability for each blob, but not for individual pixels in the blob. An image pixel $x_n$ can belong to several blobs. Therefore, to compute the probability that the pixel $x_n$ in the source image Im belongs to the class, the weighted probabilities of the nearest blobs (blobs containing the pixel) are taken, where the weights are given by the Gaussian Kernel centered in the blob center and of the variance $\sigma_i$ depends on the scale (s) at which the blob was generated:

$$P(x_n \mid B_i, Im) = \frac{1}{2\pi\sigma_i} \exp\left\{\frac{1}{2}(x_n - m_i)^T \begin{pmatrix} \sigma_i & 0 \\ 0 & \sigma_i \end{pmatrix}^{-1} (x_n - m_i)\right\} \quad (2)$$

In one embodiment, $\sigma_i = 0.6 * R * s$, where R is the patch size (R×R is the number of pixels in the patch) defining the blob at the first scale level and s defines the different scales e.g. s={1, 1.4, 2, 2.8, 4}. R may be, for example, from about 8 to about 128, or more, depending on the image resolution, e.g., 32.

Hence, the probability of a pixel $x_n$ in the image is given by the accumulated "knowledge" on each blob $B_i$ that contains the pixel that is computed as follows:

$$P(\lambda_n = c \mid B_i, Im, \theta, a, b) = \frac{\sum_{i; x \in B_i} P(\gamma_i = c \mid z_i, \theta, a, b)}{\sum_{i; x \in B_i} P(x_n \mid B_i, Im)} P(x_n \mid B_i, Im) \quad (3)$$

where $\lambda_n$ is a hidden class variable associated with the pixel $x_n$ taking as $\gamma_i$ values from $\{c, \bar{c}\}$. (Note that (2) is independent from the model $\theta$ and the classifier).

For natural images (photographs), two different probability maps can be built for each class. In one of them, $z_i$ represents local color features (e.g., means and standard deviations in RGB computed on local sub-windows). For the second map, local gradient orientation features can be used. The two class probability maps M, M' can then be combined by a simple mean operation.

As will be appreciated, other object class models based on image blobs can be considered in place of Equation (1). For example, a method based on a Latent aspects model can be used as a basis for generating the probability maps herein. Such a method can be based on that described in D. Larlus, et al., *Category level object segmentation—learning to segment objects with latent aspect models*, VISAPP (2) (2007).

In another example, the method described in U.S. patent application Ser. No. 11/170,496, filed Jun. 30, 2005, entitled GENERIC VISUAL CATEGORIZATION METHOD AND SYSTEM, by Florent Perronnin can be used in which the feature $z_i$ is related to the $k^{th}$ Gaussian of adapted vocabulary and universal vocabularies respectively of a merged GMM.

Identification of Candidate Regions (S110)

Based on the probability map(s), regions 44, 60, 62 of contiguous pixels in the image which satisfy a preselected threshold probability are then identified. Some of these regions 60, 62 may be eliminated from further consideration according to predetermined selection criteria, e.g., as being too small, too remote from other regions, or the like. At least one remaining region 44 in the image is selected as a candidate region whose location is used as a reference for determining a subpart 40 of the image 28 for cropping. The image subpart 40 to be cropped can be selected using heuristics based on location, size and cumulative probability. A region growing algorithm can be applied to list the regions that are candidates for cropping. In this step, the source image is processed to identify candidate regions of contiguous pixels that have an increased probability (as compared with other regions of the image) of containing an object in a visual category.

In general, the subpart 40 selected for cropping includes all or a substantial amount of at least one of the candidate regions 44. How the subpart is selected may depend on various selection criteria, such as the target size and shape of the context dependent thumbnail 30, its resolution, and so forth. In one embodiment, the geometric center of the candidate region may be used as the center of the subpart 40, or some other weighting used to maximize the amount of the region 44 which can usefully be incorporated in the subpart. The subpart 40 of the image which is to be used for the intelligent thumbnail is thus generated from the probability map related to the identified relevant concept.

Depending on the desired resolution, etc. of the target thumbnail image, further processing may be applied to the cropped subpart of the image to form the context dependent thumbnail image.

By way of example, one method for selecting a subpart 40 of the image for cropping is as follows. First, relevant regions 44, 60, 62 are identified based on the probability map P. This can be done for example by binarizing the map using a selected threshold Th:

$$M(i) = \begin{cases} 1 & \text{if } P(i) > Th \\ 0 & \text{otherwise} \end{cases} \quad (4)$$

The threshold Th can be a fixed (e.g., Th=0.5) or it can be dynamically computed from the probability map (e.g., keeping the highest q percent value of the map):

$$Th = \max(P) - q * (\max(P) - \min(P)) \quad (5)$$

Alternatively, more complex approaches can be used such as a combination of the probability map with low level image segmentation. See, for example, D. Comaniciu, et al., *Mean shift: A robust approach toward feature space analysis*, IEEE Trans. Pattern Analysis and Machine Intelligence, 24, 603-619 (2002); and J. Shi, et al., *Normalized Cuts and Image Segmentation*, IEEE Trans. Pattern Analysis and Machine Intelligence, Vol. 22, No 8 (2000), for examples of these approaches.

The relevant regions 44, 60, 62 are then those image segments for which the average probability values are above the threshold Th (fixed or given by Eqn. (5)). In the binary map M, regions of connected pixels are detected and only those regions of interest (ROIs) 44 above a given size are kept (e.g., those bigger than 10% of the crop window).

In the following description, only the simple case in which a single relevant region (ROI) is selected as a candidate region 44 and the intelligent thumbnail 30 corresponds to a simple rectangular image crop based on it. As will be appreciated, the method may consider several relevant regions by either considering the convex hull of their union as a candidate region or by cropping them independently and stitching the crops together. Moreover, while in the exemplary embodiment, the crop is rectangular, in other embodiments a thumbnail may be generated by cropping non-rectangular regions. The resulting thumbnail may then have an arbitrary shape.

To select from several regions (ROIs) 44, at least one of the following exemplary criteria can be considered: keeping the largest region; keep the most centered region; keeping the region for which the average probability value (in P) is the highest. Alternatively, a crop selection prior map S can be pre-defined. For example, if S is defined by a Gaussian over the whole image centered in the middle of the image this will clearly favor a centered crop on a side crop (especially if sigma is strong). This map it then combined with the probability map (e.g., P or M) to identify the best crop.

After the selection of the candidate region 44, the center of the crop window can be positioned on one of the following points:

1. The center of the mass of the ROI:

$$(c_x, c_y) = \frac{1}{|ROI|} \sum_{(x,y) \in ROI} (x, y) \quad (6)$$

2. The center of the bounding box of the ROI:

$$(c_x, c_y) = \left( \frac{e_x - b_x}{2}, \frac{e_y - b_y}{2} \right);$$

with $e_x = \max\{x | (x,y) \in ROI\}$ and $b_x = \min\{x | (x,y) \in ROI\}$ (7)

and $e_y = \max\{y | (x,y) \in ROI\}$ and $b_y = \min\{y | (x,y) \in ROI\}$

3. The pixel within the ROI with the highest probability value (in P)

$$(c_x, c_y) = \operatorname*{argmax}_{(x_i, y_i) \in ROI} P(x_i, y_i) \quad (8)$$

4. The pixel within the ROI with the highest crop selection prior value (in S).

After the center of the crop-window is selected as $(c_x, c_y)$, an image region corresponding to the target size is cropped from the image. Note that if the crop window is not included entirely in the image, the crop window can be either shifted or down-scaled and the cropped region rescaled.

In the above description, it is assumed that a given ROI 44 leads to one single crop, by pre-selecting one of the criteria for each step. In other embodiments, several of the above criteria may be employed to generate a set of potential crops, one of which is then selected based on further selection criteria.

For example, a set of candidate crops may be generated by one or more of:

1. Up and/or downscaling the crop-window with different scales $s_i$. In this case, the cropped image will be scaled by $1/s_i$.

2. Shifting horizontally and/or vertically the crop window within the image.

In the case of a set of candidate crops, the criterion for a final selection can be one or more of:

1. The crop C with the highest mean probabilities:

$$C = \operatorname*{argmax}_{C_i} \sum_{(x,y) \in C_i} P(x_i, y_i) \quad (9)$$

2. The crop C with the highest mean probabilities combined with the crop selection prior map S:

$$C = \operatorname*{argmax}_{C_i} \sum_{(x,y) \in C_i} S(x_i, y_i) P(x_i, y_i) \quad (10)$$

3. The crop with the highest aesthetic value (using for example measures such as proposed in R. Datta, et al., *Studying Aesthetics in Photographic Images Using a Computational Approach*, ECCV 2006)

or else the crop determined by another criterion.

Examples of applications in which the exemplary context dependent thumbnails may be used include the following:

Visualization of retrieved images by an information retrieval (IR) system. The object here is to emphasize/highlight the relevant object/image part related to the query (e.g., cars). This can be seen as analogous to text retrieval, where the search engine displays, for the searcher, only a part of each of a set of returned documents in which the relevant query words are highlighted. Visual searching can be greatly affected by the particular ways in which the images are displayed, especially when screen space is limited.

Displaying images, web pages, document images on small (e.g., mobile) devices. Showing only the relevant regions of the images allows for higher quality and quicker identification.

Variable printing, creation of customized and variable documents, personalized leaflets and bills, etc. In these cases, there is often a placeholder for personalized images, meaning that different images can/will be placed in each document, as illustrated in FIG. 4. When the image size is different from the placeholder size there is a need for an adaptation/image crop to the target size. If, furthermore the placeholder size is much smaller (e.g., thumbnail size) than the original image, showing only a relevant part of the image can lead to a much better overall quality than a simple resized version of the image.

Visualization and browsing of large image collections. Browsing though very large image collections is a difficult and time consuming task. New visualization methods have been proposed recently, where images are grouped/clustered together following some given criteria such as image similarity and/or geographic location (see, e.g., systems such as GoogleEarth, VirtualTour, GeoPix) and/or captions/image tags (e.g., Flikr, IGroup). The same criteria (context) of the "clustering" can be further used to create the intelligent thumbnails for even better visualization and browsing quality.

Video summaries. In the case of video summaries, an audio transcript can provide the main focus of interest of the given video shot. Accordingly a relevant thumbnail is created from the keyframes using a context derived from the transcript.

Common steps in each of the above examples include identification of the most relevant part of the image according to some context, and then "auto-crop" the relevant subpart accordingly.

FIG. 5 illustrates how the exemplary method can be applied to the case where the context is related to the source image, here the text 52 surrounding the source image. In this application, at least a portion of the text surrounding the image (e.g., on the same page, or in a related paragraph) is first analyzed (S104a). For example, natural language processing techniques or the like are used to identify a sequence of words. Based on one or more of the words, a key context is identified (S104b). It should be noted that the context can also be derived from image tags, location, time, caption, combinations thereof, and the like. The key concept is used to identify a class model which is used to generate a probability map (S106). Using the probability map P, a candidate region 44 is identified and an automatic crop of the source image performed to generate an intelligent thumbnail suitably sized, for example, to be displayed on the small screen 66 of a mobile device 68, which is used for conducting a search. When a user enters a search query on the mobile device 66 (or any other client device), the search engine may retrieve the document and display the intelligent thumbnail on the small screen 66 of the mobile device, either alone or together with a portion of the document. The user may click on the thumbnail to retrieve the entire document and/or source image.

FIG. 4 illustrates how the exemplary method can be applied to the case in which the context is related to the target image (e.g., the text surrounding the image placeholder where the intelligent thumbnail is to be positioned). Note that the context can also be query words in a content based image retrieval (CBIR) application. In this embodiment, the content of a target page containing a placeholder which is to receive an intelligent thumbnail is first analyzed. Based on the analysis, a key concept is identified. As for FIG. 5, this key concept is used to select a corresponding class model which generates a probability map. From this a subpart of the source image is selected for auto crop and an intelligent thumbnail is generated which is located on the target page according to the placeholder.

Without intending to limit the scope of the exemplary embodiment, the following examples demonstrate the application of the exemplary method to a variety of different types of image.

EXAMPLES

Example 1

Figure 6:
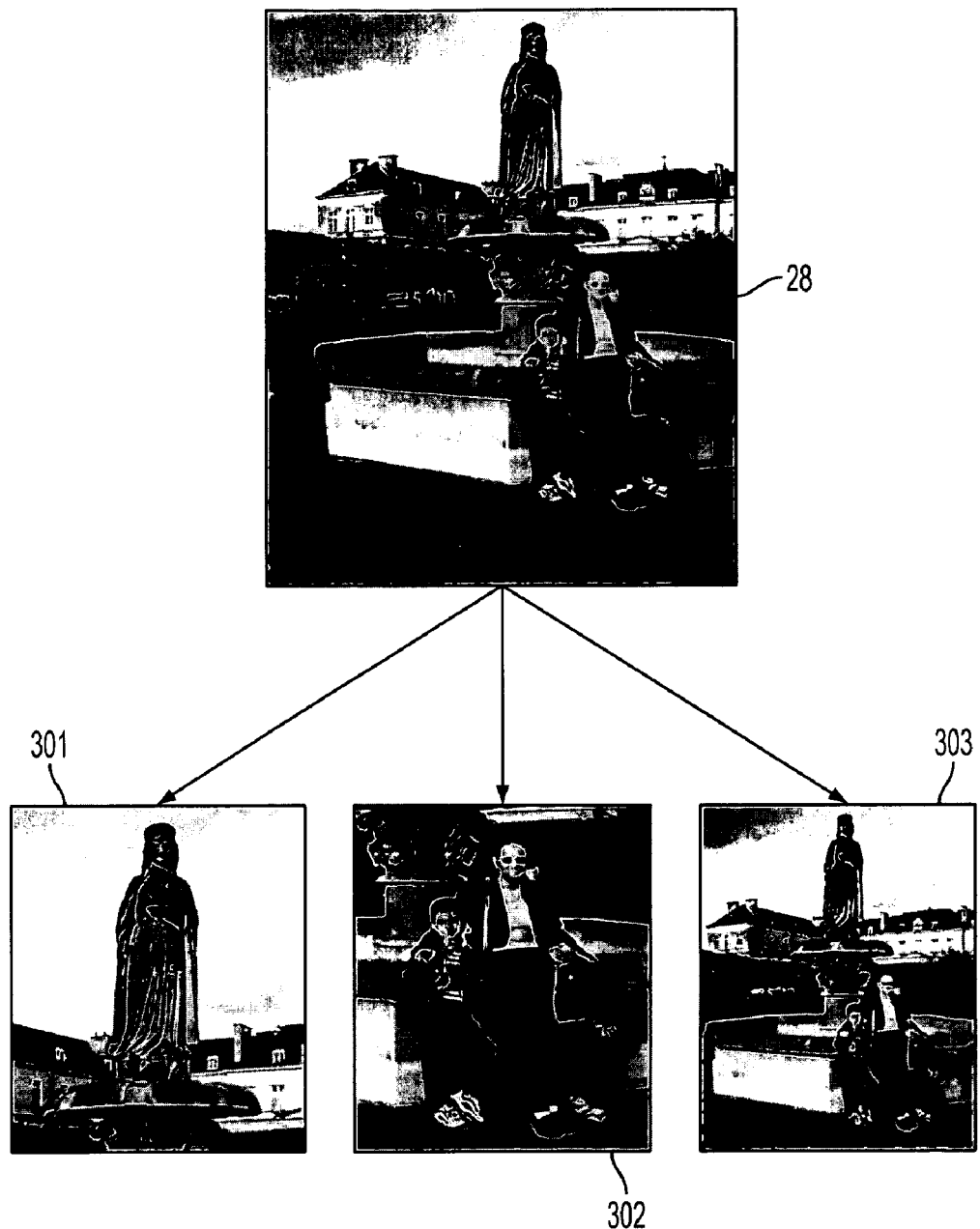
FIG. 6 illustrates the generation of different context dependent thumbnails from a common source image.

For a natural image (photograph) 28 shown in FIG. 6, two different probability maps were built for each of three classes (statues, castles, people). In one of them, $z_i$ represents local color features (means and standard deviations in RGB computed on local sub-windows). For the second map, local gradient orientation features are used. To compute the probability maps, Fisher vectors as in Eqn. 1, described above, are used. The two class probability maps are combined by a simple mean operation. The auto crop thumbnail images 301, 302, 303 generated for these three classes are shown below the source image. Depending on the context, a searcher may be interested in the "statue", in the "castle", or in "the group of people" in the picture (e.g., in a query based search). Three different intelligent thumbnails 301, 302, 303 can be generated for these contexts, respectively, given a fixed target size.

Example 2

Figure 7:
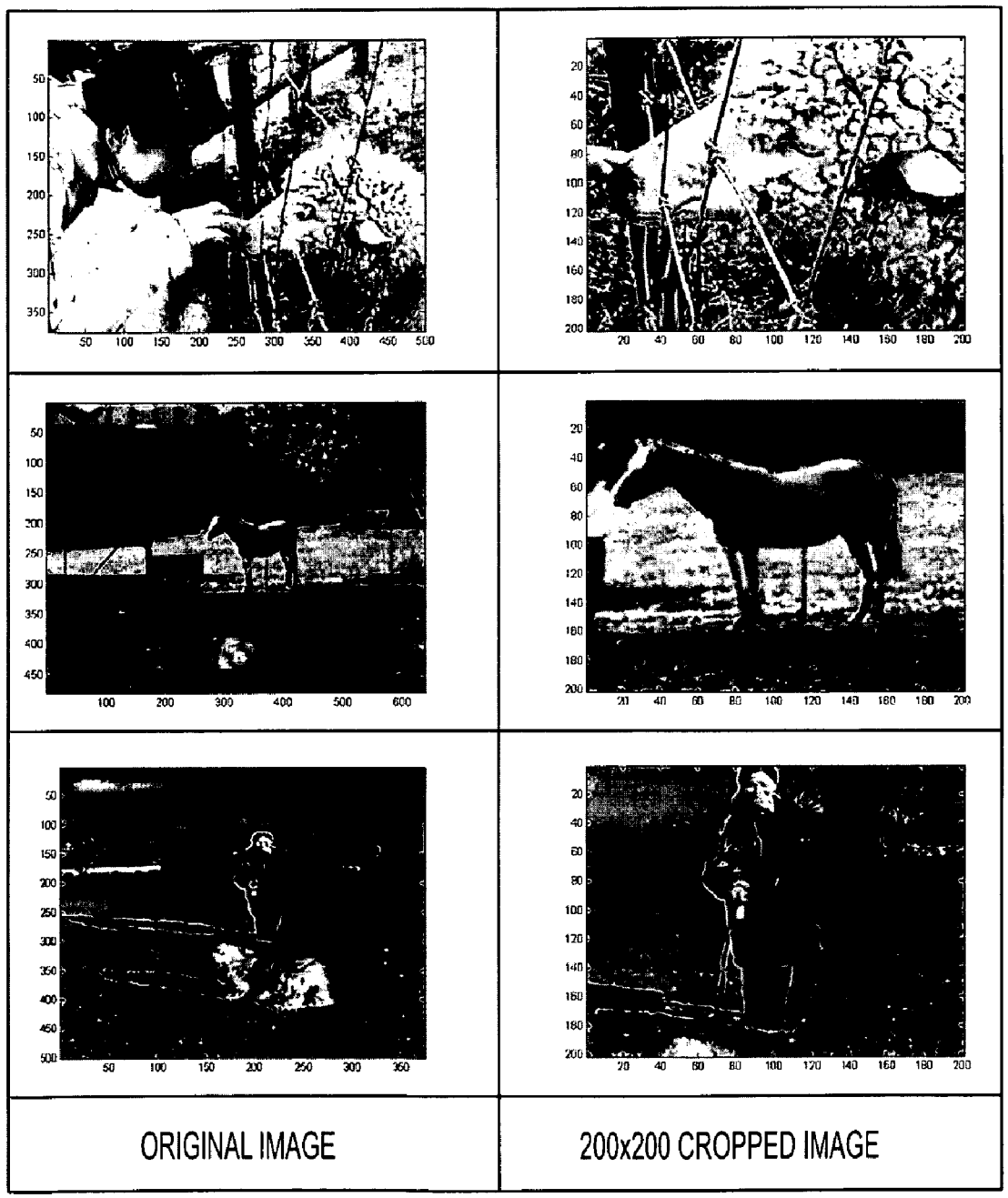
FIG. 7 illustrates the application of the exemplary method to a set of photographs as source images.

For a set of photographs, only gradient orientation features were used to build probability map using Fisher vectors, as described above. FIG. 7 shows example images and intelligent thumbnails of size 200×200 pixels generated therefrom. In these examples, a binary map M was computed from the Fisher Vector based Probability Map P (Eqn. 1) by using an adapted threshold (Eqn (5) with q=0.25). The largest region of contiguous pixels satisfying this threshold was considered as the ROI. The crop window was positioned on the center of its bounding box (Eqn. (7)) and a rectangular region of the selected target size was cropped. Class probability maps (not shown) were obtained for the original images ($1^{st}$ column) considering a "sheep" class model ($1^{st}$ row), "horse" class model ($2^{nd}$ row) and "person" class model ($3^{rd}$ row) and used to generate the resulting cropped images (second column).

Example 3

This example demonstrates that the technique is also applicable to document images. For a set of scanned document images, gradient orientation features were used to build the probability map using Fisher vectors, as described above. "Object" classes in this case were text, math, table, drawing, halftone and others.

Blobs (patches) on a uniform grid were extracted and gradient orientation based texture features computed for them. Using the universal vocabularies, Fisher Vectors were computed and the probability maps built using Eqn. (1). Concerning the cropping parameters, the target size was 500×500 for the high resolution (2592×3300) original images. The probability map was binarized with a fixed threshold (Th=0.5) and the crop window positioned in the middle of the bounding box (Eqn. (7)) around the largest contiguous pixels.

Figure 8:
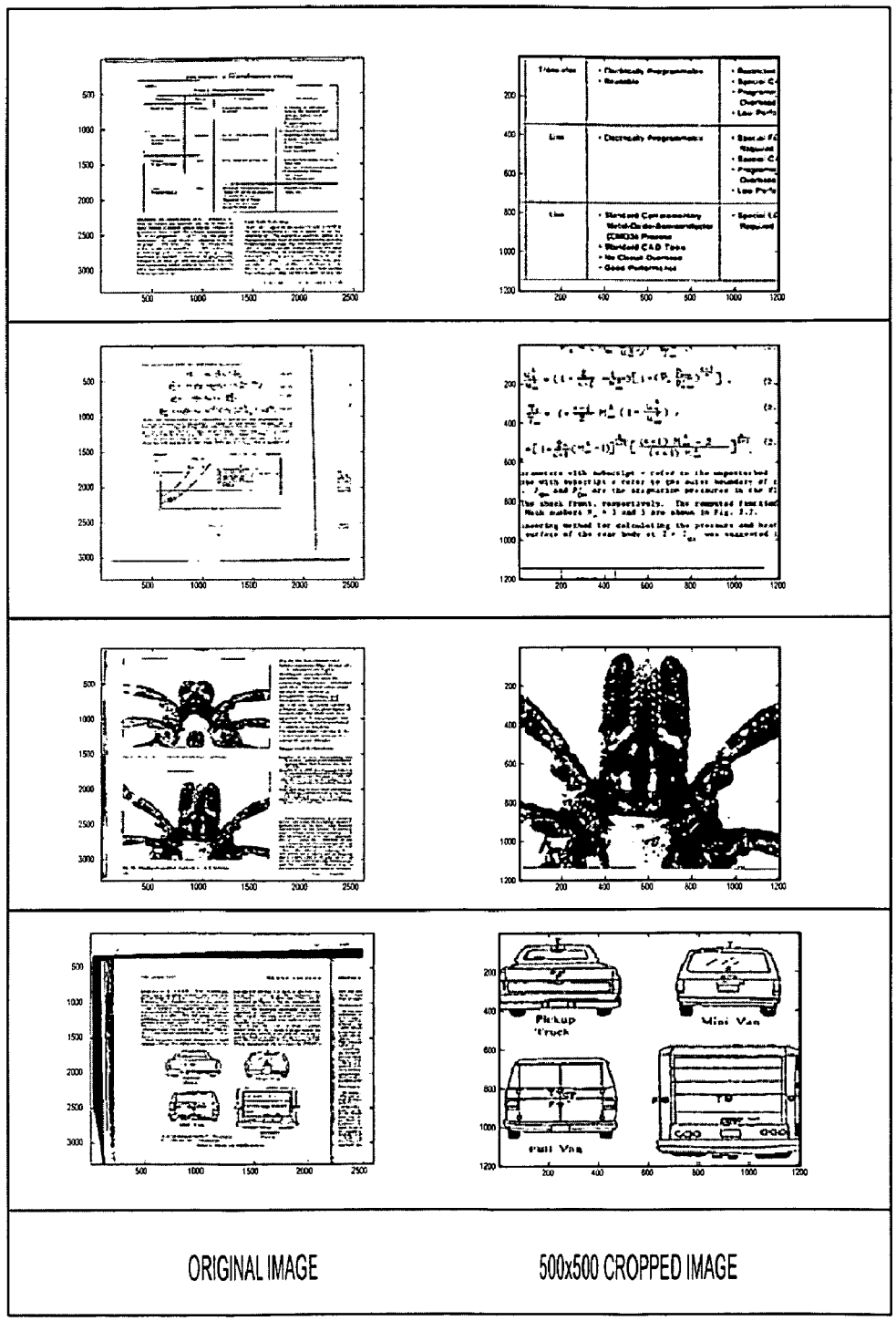
FIG. 8 illustrates the application of the exemplary method to a set of non-photographic images as source images.

FIG. 8 shows example image crops of size 500×500. The class probability maps (not shown) were obtained for the original images ($1^{st}$ column) considering "drawing" class model ($1^{st}$ row), "halftone" class model ($2^{nd}$ row), "math" class model ($3^{rd}$ row) and "table" class model ($4^{th}$ row).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for cropping a source image comprising:
identifying a context for the source image;
identifying a visual class corresponding to the identified context from a set of visual classes;
with a processor, applying a class model to the source image to identify a candidate region of the image based on its relevance to the visual class; and
identifying a subpart of the source image for cropping based on the candidate region.

2. The method of claim 1, wherein the context is identified from at least one of text, tags, and metadata of a document comprising the source image.

3. The method of claim 1, wherein the context is identified from at least one of text, tags, and metadata of a document which is designated to receive the cropped image.

4. The method of claim 1, wherein the context is derived from a search query and the source image is in a document retrieved as responsive to the search query.

5. The method of claim 1, wherein the applying of the class model includes generating a probability map in which pixels of the source image or an image derived therefrom are each associated with a probability of being in the identified visual class.

6. The method of claim 5, wherein each pixel probability is based on a probability that a region in which the pixel is located is in the visual class.

7. The method of claim 5, wherein at least some of the visual classes are object classes and wherein the class models are trained on a set of training images which have been assigned to the class.

8. The method of claim 5, wherein the applying of the class model includes applying a first class model to generate a first probability map in which pixel probabilities are based on a first feature, applying at least a second class model to generate at least a second probability map in which pixel probabilities are based on a second or subsequent feature, and combining the first and at least second probability maps.

9. The method of claim 5, further comprising thresholding the pixel probabilities to identify pixels which at least meet the threshold.

10. The method of claim 1, wherein the applying of the class model comprises identifying at least one candidate region in the source image in which pixels have at least a threshold probability for the visual class.

11. The method of claim 1, wherein a location of the candidate region is used to identify the subpart.

12. The method of claim 1, further comprising cropping the source image and forming a context dependent thumbnail image from a cropped subpart.

13. The method of claim 12, further comprising resizing the cropped subpart to form the context dependent thumbnail image.

14. The method of claim 1, wherein the class model comprises a generic visual classifier which determines features vectors for a plurality of regions in the image.

15. The method of claim 1, wherein at least a first of the visual classes relates to people and at least a second of the visual classes relates to a class of inanimate objects.

16. The method of claim 1, wherein the source image comprises at least one of the group consisting of photographs, graphics, images with associated text, tables, graphs, medical images, maps, composite images, sets of images, video images, and combinations and multiples thereof.

17. The method of claim 1, further comprising displaying a context dependent thumbnail derived from the cropped subpart.

18. A computer program product encoding instructions stored in a non-transitory computer readable medium, which when executed on a computer causes the computer to perform the method of claim 1.

19. An image cropping apparatus comprising a processor which executes instructions stored in memory for performing the method of claim 1.

20. An apparatus for cropping a source image comprising:
 a context finder which automatically identifies a context for the source image;
 a visual categorizer which automatically identifies a visual class corresponding to the identified context from a set of visual classes; and applies a class model to the source image to identify a candidate region of the image based on its relevance to the visual class;
 an image cropper which crops a subpart of the source image based on the candidate region;
 a processor which implements the context finder visual categorizer and image cropper; and
 memory which stores the source image to be cropped.

21. The apparatus of claim 20, wherein the visual categorizer comprises a set of class models, each of the class models being associated with a different one of the visual classes.

22. The apparatus of claim 20, wherein the apparatus is capable of cropping a first subpart for a first identified context and a second subpart, different from the first subpart, for a second identified context.

23. A computer implemented method of variable printing comprising:
 identifying a context for a document to receive a cropped image;
 identifying a visual class corresponding to the identified context from a set of visual classes;
 applying a class model to a source image to identify a candidate region of the image based on its relevance to the visual class;
 cropping a subpart of the source image based on the candidate region; and
 incorporating the cropped subpart into the document.

24. A method for assisting a user in assessing the relevance of documents responsive to a query comprising:
 receiving a user query;
 retrieving a document responsive to the query;
 identifying a context based on at least one of the user query and the retrieved document;
 identifying a visual class corresponding to the identified context from a set of visual classes;
 with a processor, applying a class model to a source image in the retrieved document to identify a candidate region of the source image based on its relevance to the visual class;
 identifying a subpart of the source image for cropping based on the candidate region; and
 displaying a context-dependent thumbnail derived from the identified subpart to assist a user in assessing the relevance of the document.

25. A computer program product comprising a non-transitory medium on which a control program is recorded which when executed by a computer apparatus, performs a method for cropping a source image comprising:
 identifying a context for the source image;
 identifying a visual class corresponding to the identified context from a set of visual classes;
 applying a class model to the source image to identify a candidate region of the image based on its relevance to the visual class; and
 identifying a subpart of the source image for cropping based on the candidate region.

26. The computer program product of claim 25, wherein the non-transitory medium on which the control program is recorded comprises a disk, a hard drive, a magnetic tape, a RAM, a PROM, an EPROM, a FLASH-EPROM, other memory chip, or a cartridge.

* * * * *